US006824378B2

(12) United States Patent
King et al.

(10) Patent No.: US 6,824,378 B2
(45) Date of Patent: Nov. 30, 2004

(54) MICROREPLICATION TOOL WITH GAS RELEASE FEATURES

(75) Inventors: Vincent W. King, Woodbury, MN (US); Joseph M. D'Sa, Woodbury, MN (US); Robert T. Fehr, Saint Paul, MN (US); James A. Servatius, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/160,744

(22) Filed: May 31, 2002

(65) Prior Publication Data

US 2003/0224144 A1 Dec. 4, 2003

(51) Int. Cl.[7] .............................................. B29C 33/10
(52) U.S. Cl. ...................... 425/542; 425/363; 425/471; 425/812
(58) Field of Search ................................ 425/363, 470, 425/471, 542, 812; 249/141

(56) References Cited

U.S. PATENT DOCUMENTS

| 86,660 | A | | 2/1869 | Gillinder | |
|---|---|---|---|---|---|
| 3,399,425 | A | | 9/1968 | Lemelson | |
| 3,822,857 | A | * | 7/1974 | Tanie | ........................... 249/141 |
| 4,208,368 | A | | 6/1980 | Egli | |
| 4,846,938 | A | | 7/1989 | Tazaki et al. | |
| 5,077,870 | A | | 1/1992 | Melbye et al. | |
| 5,688,193 | A | * | 11/1997 | Kasasima et al. | ............ 473/379 |
| 5,845,375 | A | | 12/1998 | Miller et al. | |
| 6,223,401 | B1 | | 5/2001 | D'Sa | |
| 2002/0035854 | A1 | * | 3/2002 | Herzbach et al. | ............... 65/81 |
| 2003/0102591 | A1 | * | 6/2003 | Thielman et al. | ........... 264/166 |

FOREIGN PATENT DOCUMENTS

| EP | 0 771 537 A2 | | 5/1997 |
|---|---|---|---|
| JP | 58047538 | | 3/1983 |
| JP | 07-80848 | * | 3/1995 |

OTHER PUBLICATIONS

Weber et al, Mikroabformung, Verfahren, Werkzeuge, Anwendungen, Micro–Moulding—Processes, Moulds, Applications, Kunststoffe, Carl Hanswer Verlag, Munchen, DE, vol. 88, 1998 pp. 1791–1792, 1794, 1796, 1798, 1800, 1802, XP000981365 (translation attached).
Menges, G; Michaeli, W.; Mohren, P., How to Make Injection Molds 2000, Hanser, Munich XP002252598.
Bowen, R.: "Proper Utilization of Porous Mold Steel to Solve Venting Problems" ANTEC 1999—Annual Technical Conference of the Society of Plastics Engineers, vol. 1, May 1999, XP002252597.

* cited by examiner

*Primary Examiner*—James P. Mackey
*Assistant Examiner*—Donald Heckenberg
(74) *Attorney, Agent, or Firm*—Stephen W. Buckingham

(57) ABSTRACT

In one embodiment, a microreplication tool includes gas release features that allow gas to escape from microreplication cavities of the tool. The gas release features can be disposed at the bottoms of the respective cavities to avoid air entrapment within the cavities of the tool during the microreplication process. In this manner, the quality of the microreplicated product can be improved.

12 Claims, 12 Drawing Sheets

FIG. 1A (AMENDED)

MICROREPLICATION TOOL WITH GAS RELEASE FEATURES

FIELD

The invention relates generally to microreplication, and more particularly to tools used in a microreplication process.

BACKGROUND

Microreplication techniques can used to create a wide variety of microreplicated structures. Microreplicated structures are defined herein as structures that include features having at least one dimension smaller than 1000 microns. In one example, the features may form tapered protrusions that extend from a backing structure. In that case, the microreplicated structure may comprise one side of a mated surface fastener. For example, the mated surface fastener may include two microreplicated structures formed with tapered protrusions that extend from respective backing structures, and have cross-sectional widths smaller than 1000 microns. The protrusions may also collectively define an array of recesses. Thus, the two microreplicated structures can be pressed together such that the tapered protrusions mate with opposing recesses in an interlocking arrangement, thereby attaching the two microreplicated structures to one another.

Microreplication processes typically utilize microreplication tools such as a casting belt, a casting roller, an injection molding tool, or the like. For example, the microreplication tool may be used in an extrusion process or an injection molding process in which the microreplicated structures are created. The microreplication tool may include small cavities that define the microreplicated features of the microreplicated structure to be created. During the replication process, however, air entrapment within the cavities may undermine the quality of the microreplicated features. In other words, trapped air within the cavities of the microreplication tool may limit the ability of material being microreplicated to completely fill the cavities.

SUMMARY

In general, the invention is directed to a microreplication tool that includes gas release features that allow gas to escape from microreplication cavities of the tool. Various embodiments may be directed to the microreplication tool, techniques for creating the tool, techniques for using the tool, and microreplicated structures created using the tool. The microreplication tool may comprise an extrusion tool, such as a casting belt or a casting roller, or an injection molding tool used for injection molding structures that define the small microreplicated features.

In one embodiment, a microreplication tool includes a set of cavities used to form microreplicated features during a microreplication process. The tool may also include gas release features disposed adjacent bottom regions of the respective cavities to allow gas to escape from the cavities during the microreplication process. In this manner, air entrapment within the cavities of the tool during the microreplication process can be avoided, thereby improving the quality of the microreplicated product.

Additional details of these and other embodiments are set forth in the accompanying drawings and the description below. Other features, objects and advantages will become apparent from the description and drawings, and from the claims.

DETAILED DESCRIPTION

The following disclosure describes microreplication tools that include gas release features that allow gas to escape from microreplication cavities of the tool. The microreplication tool may comprise an extrusion tool, such as a casting belt or a casting roller, or possibly an injection molding tool used for injection molding structures that define the small microreplicated features. As outlined in greater detail below, incorporating gas release features in the microreplication tool can improve the quality of microreplicated structures created using the tool by reducing air entrapment within the cavities during the microreplication process. In particular, by reducing air entrapment within the cavities during the microreplication process, the incidence of surface irregularities or other air pocket artifacts on the microreplicated structures can be reduced or substantially eliminated.

Figure 1A:
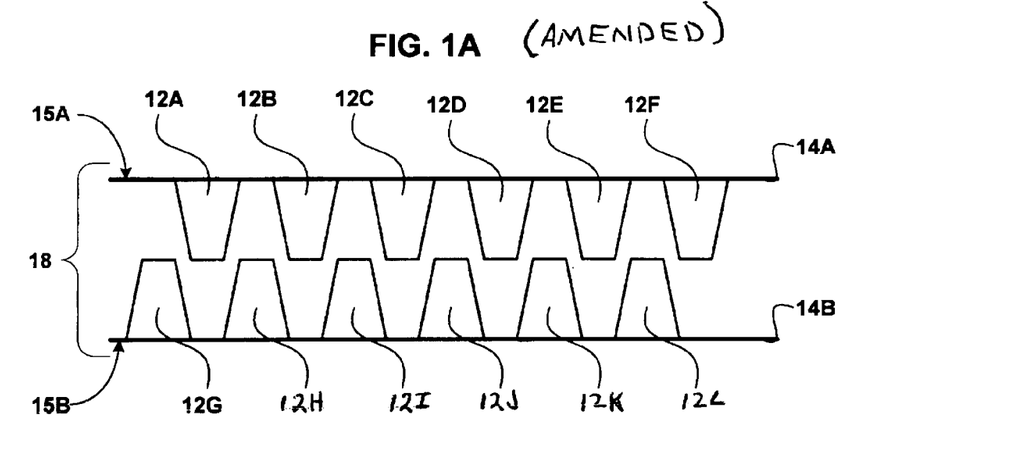
FIG. 1A is an enlarged cross-sectional view of two microreplicated structures that collectively form a mated fastening structure.
Figure 1B:
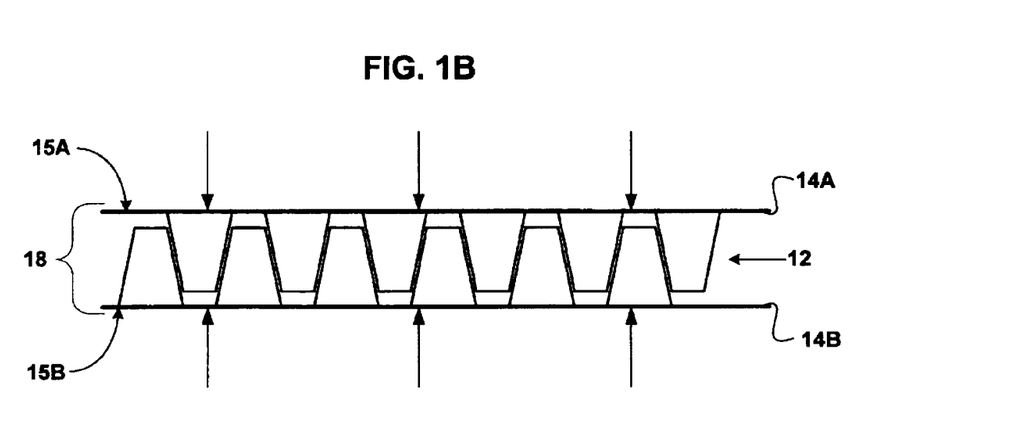
FIG. 1B is another enlarged cross-sectional view of the mated fastening structure of FIG. 1A, with the two microreplicated structures being forced together into mated engagement.

FIG. 1A is a cross-sectional view of two microreplicated structures that collectively form a mated fastening structure. In this example, microreplicated features 12A–12F (collectively features 12) in the form of tapered protrusions, extend from a backing structure 14A to form a first microreplicated structure 15A. Similarly, microreplicated features 12G–12L (collectively features 12) in the form of tapered elements extend from a backing structure 14B to form a second microreplicated structure 15B. As illustrated in FIG. 1B, first microreplicated structure 15A and second microreplicated structure 15B can be forced together such that the microreplicated features 12 fit together in a friction-fit interlocking arrangement. In this manner, first and second microreplicated structures 15A and 15B define a mated surface fastener 18. Accordingly, back sides of first and second microreplicated structures 15A and 15B structures can be affixed to different articles or surfaces so that mated surface fastener 18 serves as a connecting structure.

As outlined below, first and second microreplicated structures 15A and 15B can be created using microreplication tools that include gas release features that allow gas to escape from microreplication cavities of the tool. In this manner, the shape of microreplicated features 12 can be more precisely defined by the cavities of the tool, and the incidence of physical artifacts, i.e., irregularities, on features 12 caused by air entrapment within the tool can be reduced or substantially avoided.

Figure 2:
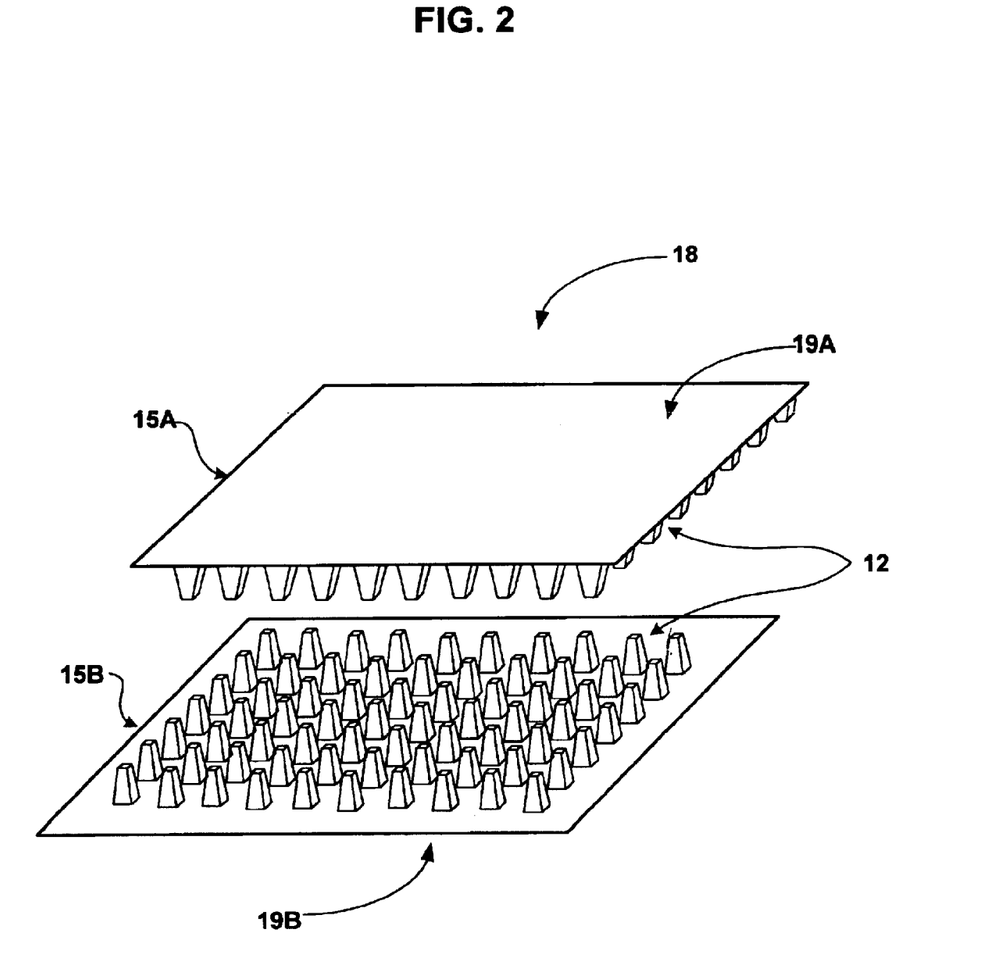
FIG. 2 is a perspective view of two microreplicated structures that collectively form a mated fastening structure.

FIG. 2 is a perspective view of mated surface fastener 18 illustrated in FIGS. 1A and 1B. In the example of FIG. 2, features 12 have a four-sided profile. However, the profile may be defined to include any number of sides. A circular, oval or elliptical profile may also be defined, if desired.

In general, mated surface fastener 18 can be used for a wide variety of applications. For example, the outer surfaces 19A and 19B of sides 15A and 15B may be adhered to items so that the items can be removably fastened to one another. Mated surface fastener 18 may be particularly useful for clean room applications where adhesives may cause contamination. Medical clean rooms and clean rooms used for electronic circuit construction or assembly are two examples. Other applications may include applications for anti-skid surfaces, fasteners for pull-over covers, handle wraps for sports equipment or the like, applications for plasma display panels, and other applications. Nevertheless, it is understood that the embodiments outlined below are readily applicable to a wide variety of microreplicated features and microreplicated structures. In other words, tapered protrusions of microreplicated structures that form a mated surface fastener are just one exemplary embodiment of microreplicated features that can benefit from the invention.

Figure 3:
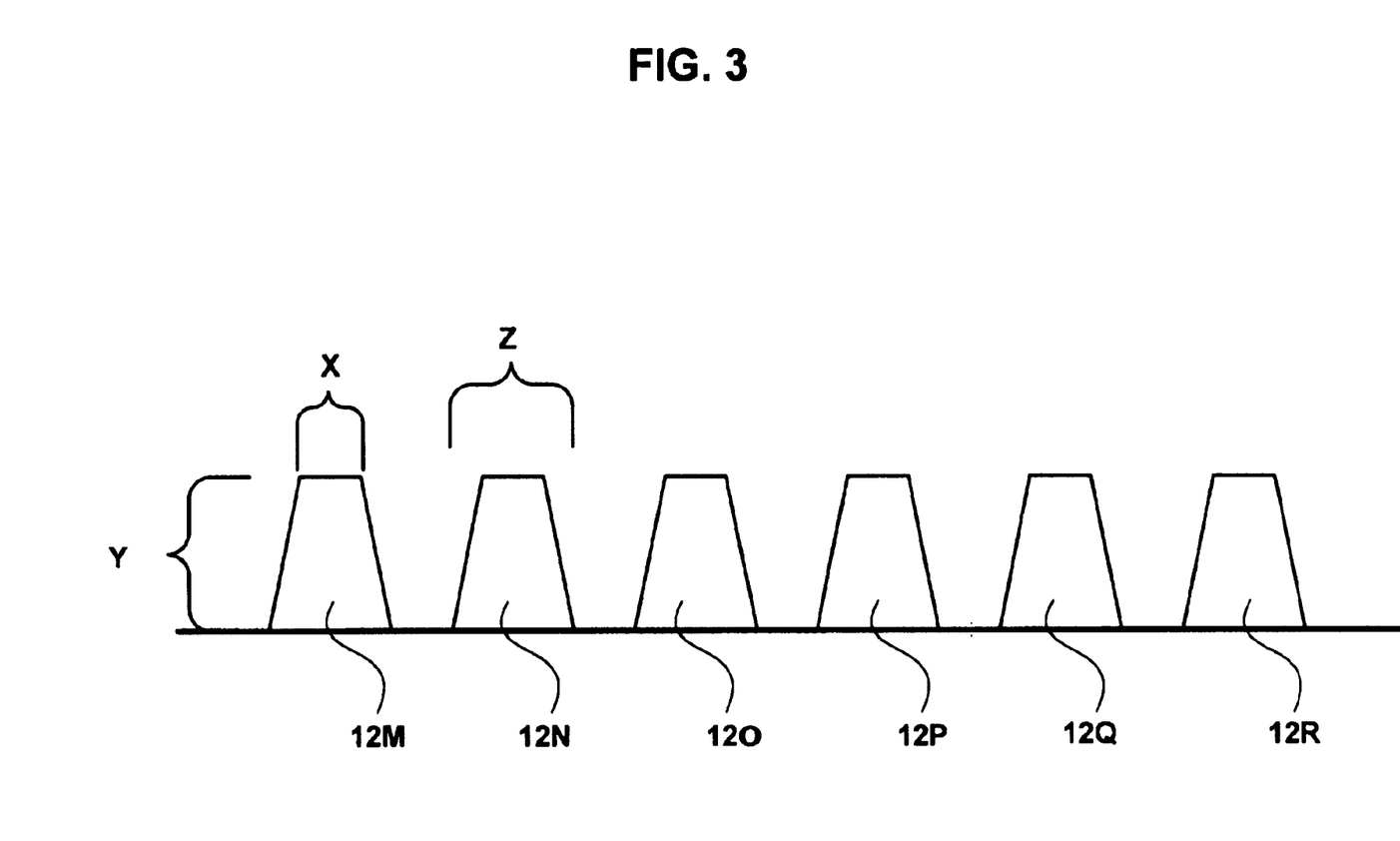
FIG. 3 is another enlarged cross-sectional view of a microreplicated structure according to an embodiment of the invention.

FIG. 3 is another cross-sectional view of a microreplicated structure according to an embodiment of the invention. As shown, each microreplicated feature 12M–12R (collectively features 12) may have a number of dimensions (X, Y and Z). In this disclosure, the terms microreplication and microreplicated features relate to features (such as features 12) that have at least one dimension less than approximately 1000 microns. In other words, at least one of the dimensions X, Y or Z is less than approximately 1000 microns. For example, microreplicated features 12 may have a width X on the order of approximately 15–70 microns, a height Y on the order of approximately 45–210 microns, and width Z on the order of 15–70 microns. Features 12 may also be characterized as having a high aspect ratio, such as an aspect ratio larger than 3, larger than 5, or larger than 10. In other words, the height Z may be approximately 3, 5 or 10 times larger than the width X or the width Y. In any case, by using the techniques outlined in greater detail below, features 12 can be more precisely defined by the cavities of the microreplication tool. Thus, features 12 generally do not exhibit artifacts or surface irregularities caused by air entrapment within cavities of the microreplication tool. The techniques are particularly useful when creating features with high aspect ratios.

Figure 4:
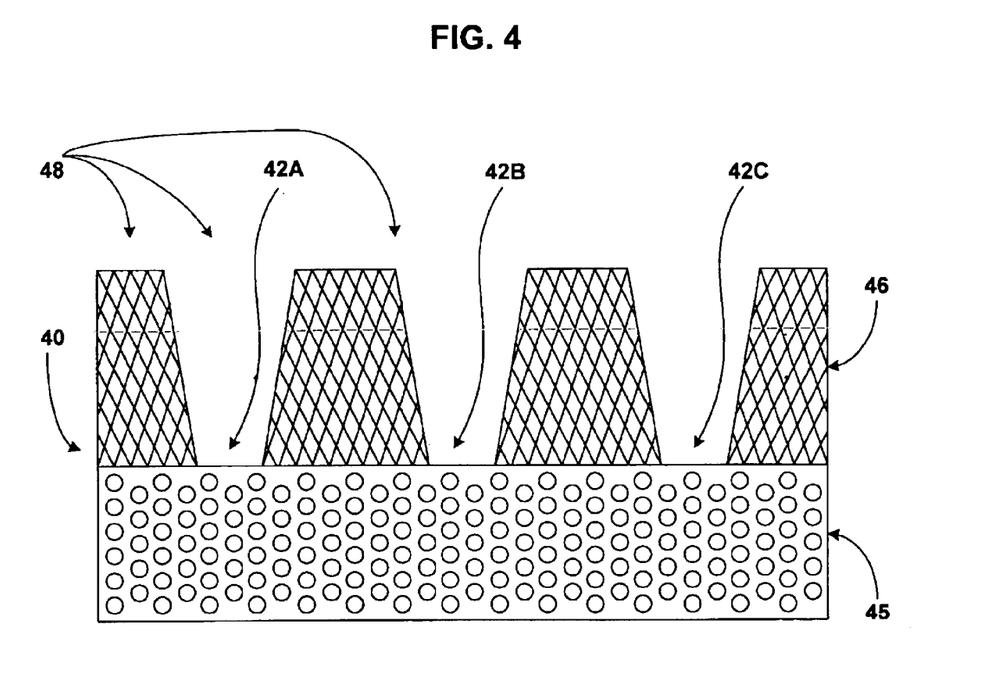
FIG. 4 is a cross-sectional view of a microreplication tool according to an embodiment of the invention.

FIG. 4 is an enlarged cross-sectional side view of one embodiment of a portion of microreplication tool 40. For example, microreplication tool 40 may be a casting belt or a casting roller used in an extrusion process, a molding tool used in an injection molding apparatus, or any other microreplication tool. As illustrated, microreplication tool 40 includes a microreplication surface 48 formed with a number of cavities 42A, 42B, 42C (collectively referred to as cavities 42). Cavities 42 are used to form microreplicated features (such as features 12) during a microreplication process. Accordingly, the size and shape of cavities 42 may substantially correspond to the size and shape of features 12 described above, and may also vary according to any desired shape of microreplicated features. As illustrated in FIG. 4, microreplication tool 40 includes gas release features disposed adjacent bottom regions of the respective cavities 42 to allow gas to escape from the cavities during the microreplication process. In the example of FIG. 4, the gas release features comprise a layer of porous material 45 that defines the bottom of cavities 42.

To create microreplication tool 40, a porous material 45 can be provided, such as in the form of a substrate. The porous material 45 can be masked, such as by using electroforming masking techniques. Material 46 can then be electroformed on the porous material 45. In other words, the masking of porous material 45 can define the microreplication pattern of cavities defined by electroformed material 46 after the electroforming process. A deposition process may precede the electroforming process to form a thin layer of material that serves as a seed layer to the electroformed material. Material can be electroformed to an extent sufficient to define widths and depths of the cavities used for creating features 12 described above. Importantly, because porous material 45 forms the bottoms of cavities 42, gas can escape through the porous material 45 when the microreplication tool is used. Thus, when used in a microreplication process, microreplication tool 40 can be more completely filled with deposited material because air is not trapped in cavities 42.

Figure 5:
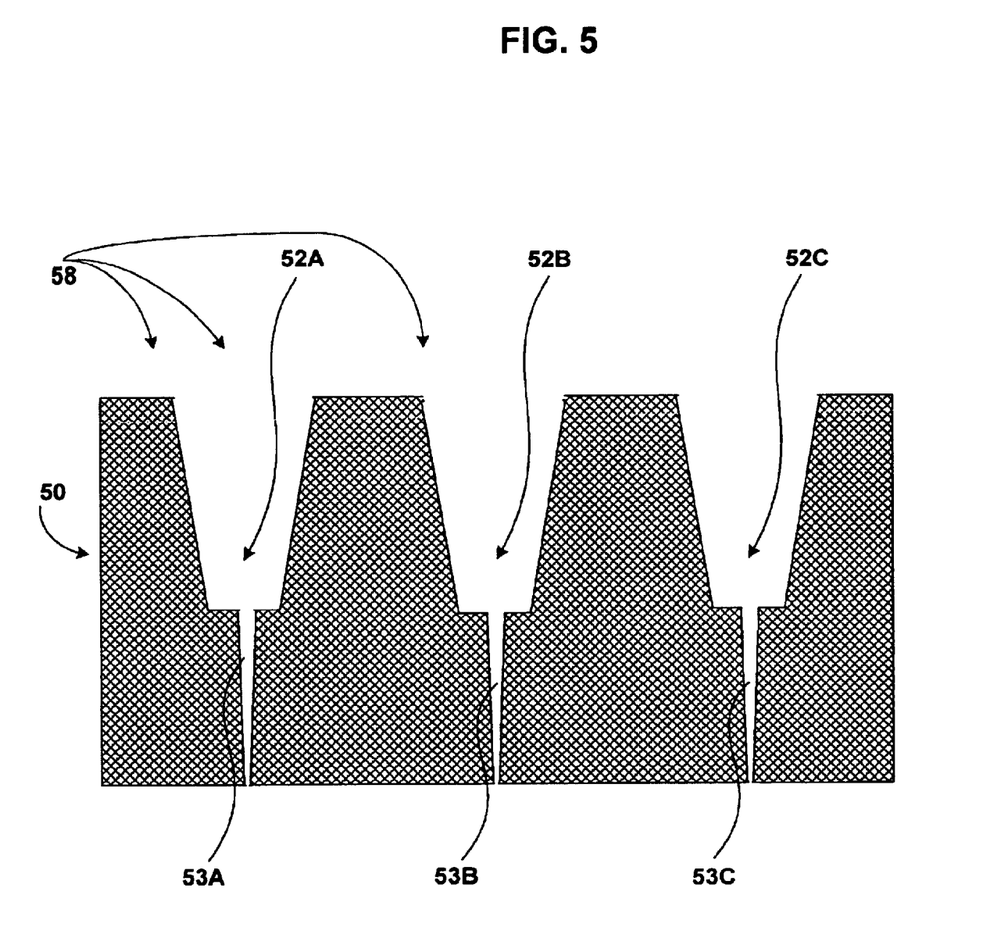
FIG. 5 is an enlarged cross-sectional view of a microreplication tool according to another embodiment of the invention.

FIG. 5 is an enlarged cross-section side view of another embodiment of a portion of a microreplication tool 50. Again, microreplication tool 50 may be a casting belt or a casting roller used in an extrusion process, a molding tool used in an injection molding apparatus, or any other microreplication tool. As illustrated, microreplication tool 50 includes a microreplication surface 58 formed with a number of cavities 52A, 52B, 52C (collectively referred to as cavities 52). Cavities 52 are used to form microreplicated features (such as features 12) during a microreplication process. Again, the size and shape of cavities 52 may substantially correspond to the size and shape of features 12 described above. As illustrated in FIG. 5, microreplication tool 50 includes gas release features disposed adjacent bottom regions of the respective cavities 52 to allow gas to escape from the cavities during the microreplication process. In the example of FIG. 5, the gas release features comprise channels 53A, 53B and 53C (collectively channels 53) formed at the bottoms of cavities 52.

In particular, channels 53 may be sized so that that air or other gasses can escape, while the material being microreplicated cannot escape. Thus, during the microreplication process, cavities 52 of microreplication tool 50 can be more completely filled because air is not trapped in cavities 52. In other words, during the microreplication process, air or other gasses can escape through channels 53 so that cavities 52 can be more completely filled with material. In this manner, features of microreplicated structures (such as features 12 described above) can be improved by avoiding surface irregularities or artifacts associated with air entrapment within cavities 52.

As mentioned above, the dimensions of channels 53 may be defined so that the material being used to fill cavities 52 cannot pass through the channels, but trapped gasses can escape. For example, the cross-sectional width of channels 53 (defined perpendicular to a direction that air flows through channels 53) may be as small as approximately 20 microns, approximately 10 microns, approximately 1 micron or even approximately 0.1 microns at the smallest diameter point. In different embodiments, the optimal width of channels 53 may be selected based on the material composition used to create the final microreplicated product.

Figure 6:
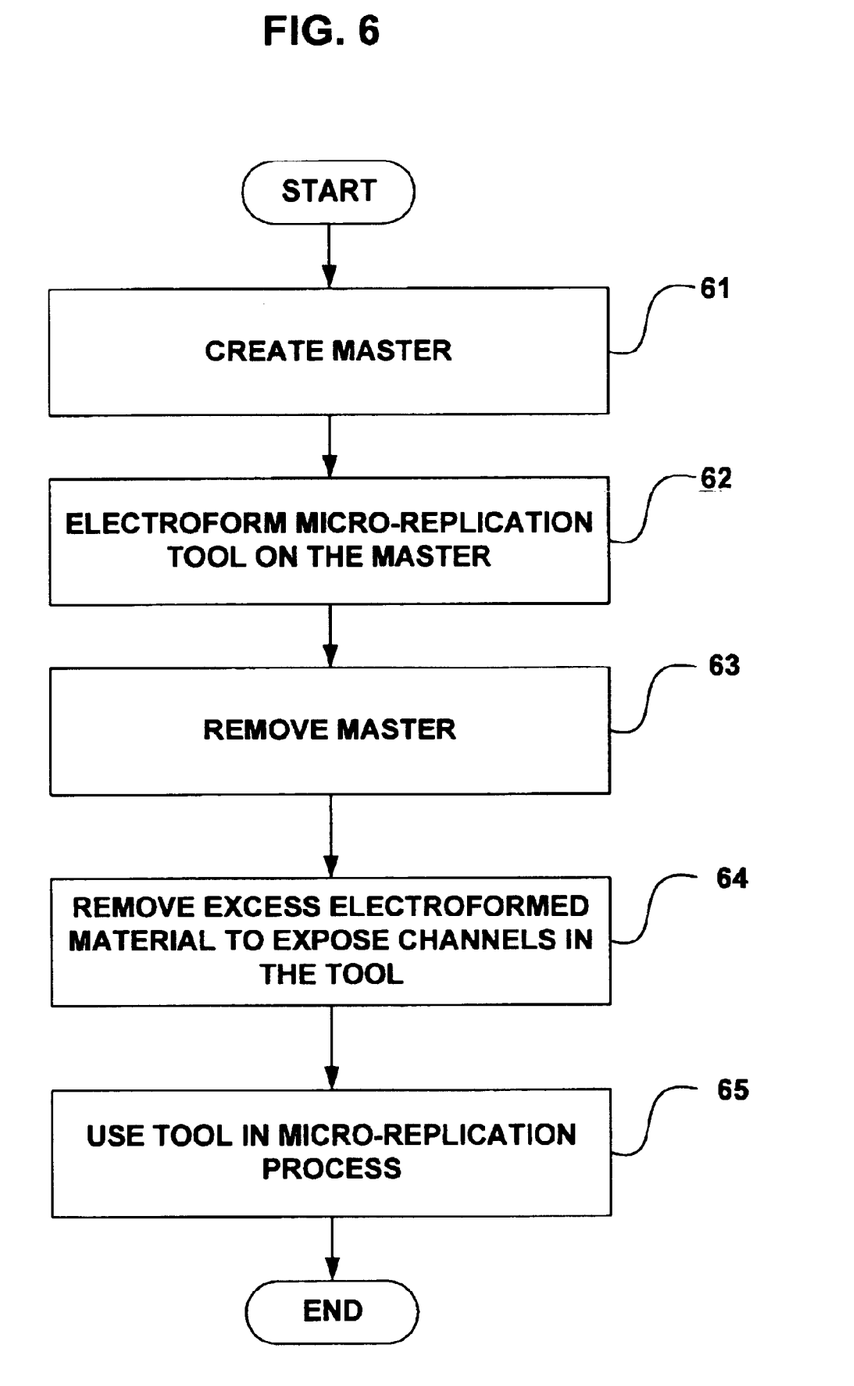
FIG. 6 is a flow diagram illustrating an exemplary process for the creation and use of a the microreplication tool illustrated in FIG. 5.
Figure 7:
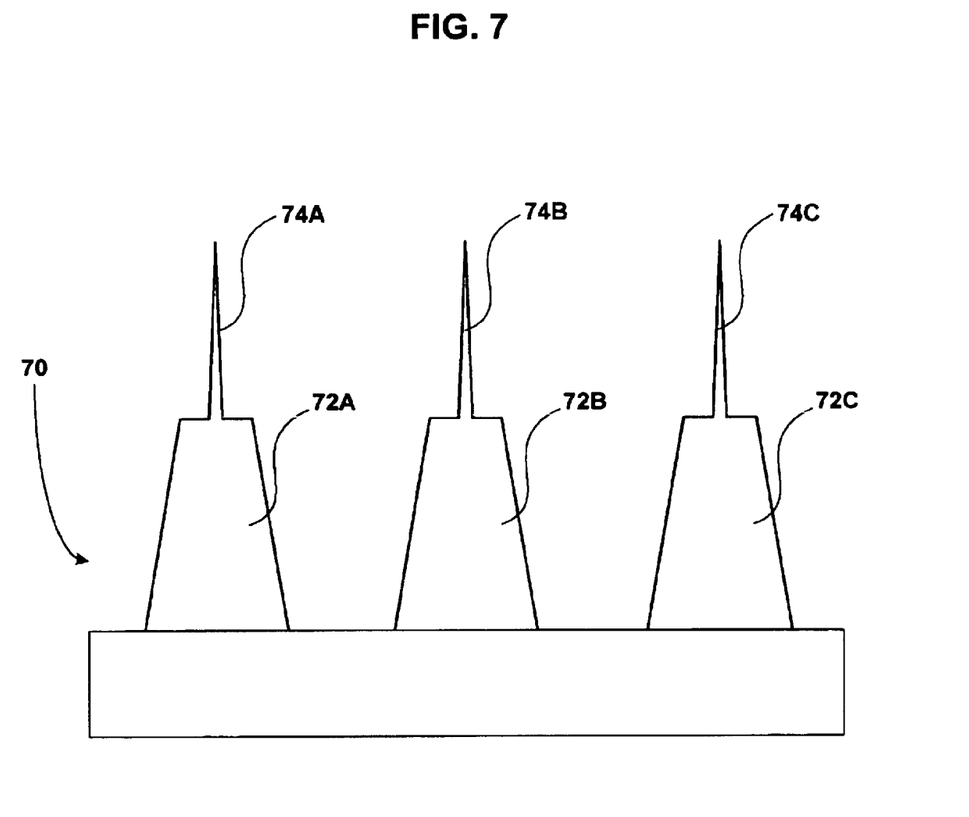
FIG. 7 is an enlarged cross-sectional view of a master that can be used in creating a microreplication tool.

FIG. 6 is a flow diagram illustrating the creation and use of a the microreplication tool illustrated in FIG. 5. The creation process for microreplication tool 50 may begin with a mastering process. In particular, a master is created (61) to define mastered features that are the inverse of a set of cavities to be created in the microreplication tool. In addition, the mastered features can be formed to include pyramid-like protrusions at the ends of the mastered features. FIG. 7 is an enlarged cross-sectional side view of an exemplary master 70 that includes mastered features 72A, 72B and 72C (collectively mastered features 72) formed to include pyramid-like shaped protrusions 74A, 74B and 74C (collectively pyramid-like shaped protrusions 74) at the ends of the mastered features 72.

Mastered features 72 may be the inverse of the cavities 52 to be created in microreplication tool 50 (FIG. 5). Similarly, pyramid-like protrusions 74 may be the inverse of the channels 53 to be created in microreplication tool 50. The mastering process may involve one or more of a wide variety of known mastering techniques. For example, diamond turning techniques, laser machining techniques, conventional machining techniques such as carbide milling, electrodischarge machining (EDM) techniques, reactive ion etching techniques, additive processes such as stereo lithography, or the like, may be used to create master 70 (61). Mastered features 72 may ultimately define the size and shape of features being created (such as features 12 shown in FIGS. 1–3).

Figure 8:
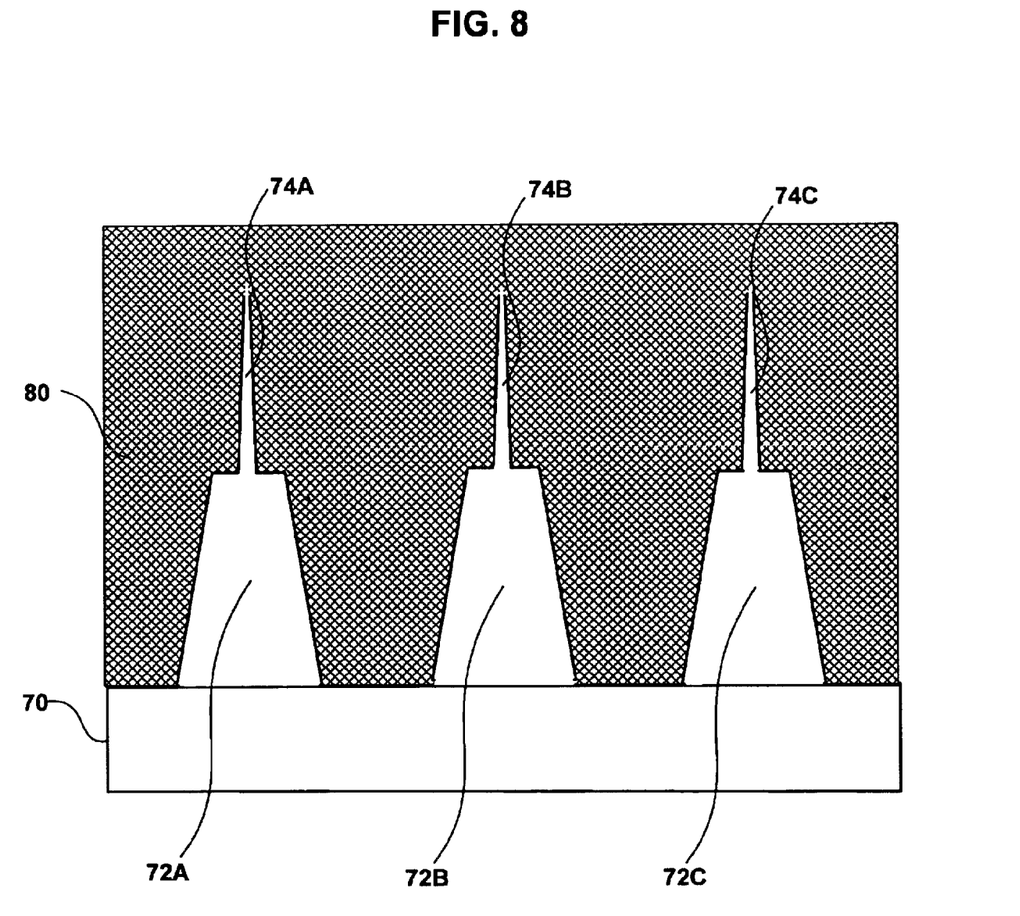
FIG. 8 is an enlarged cross-sectional view of the master of FIG. 7 with material electroplated on the mastered surface.

Once the master 70 is created, the microreplication tool can be electroformed onto the master (62). FIG. 8 illustrates a structure that includes master 70 with material 80 electroformed on the master surface. The electroformed material 80, for example, may completely cover mastered features 72 as well as pyramid-like shaped protrusions 74. Electroforming techniques are well know techniques for forming a relatively thick layer of material on a master surface. For example, a thin layer of material may be originally deposited on the master surface, before placing the coated master surface in an electroforming process solution. Electroforming techniques can then be used to uniformly form material 80 on the master surface. The electroformed material 80 may comprise a metal, such as nickel, copper, or the like, and the metal can be uniformly built up to the desired thickness, such as a thickness sufficient to completely cover mastered features 72 and pyramid-like protrusions 74.

Figure 9:
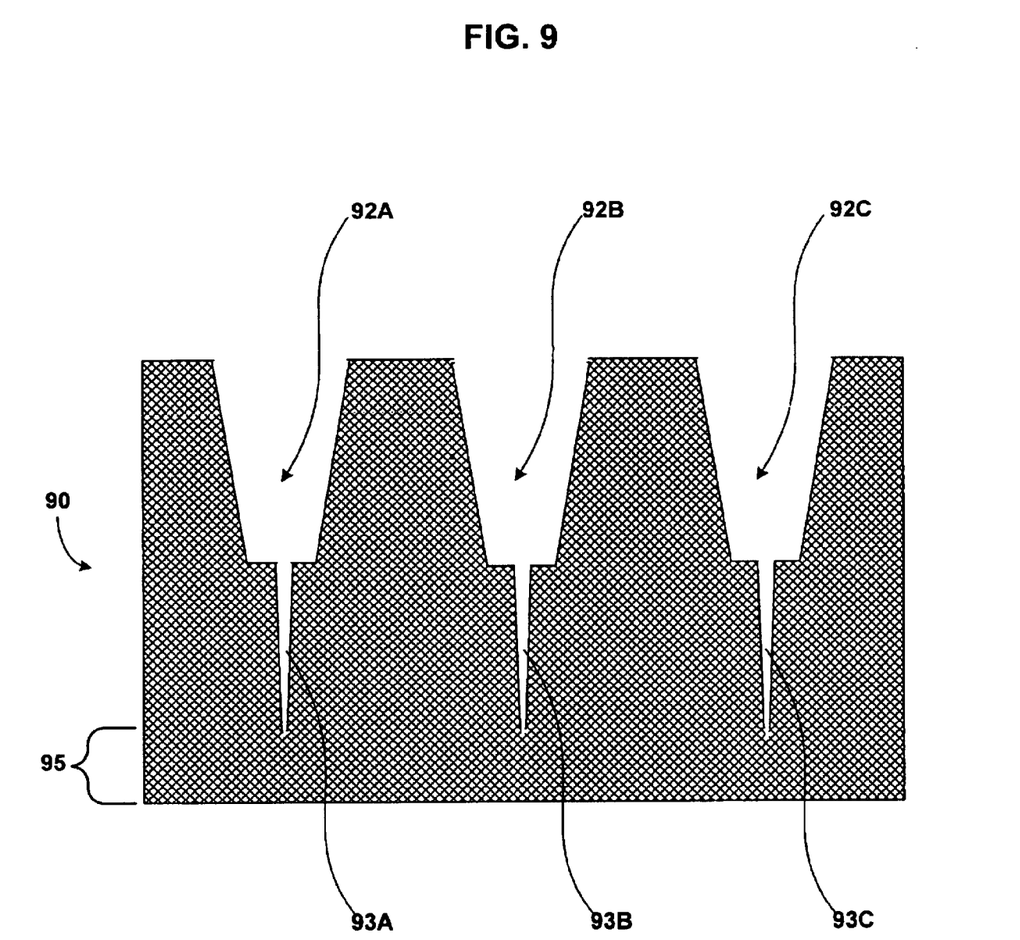
FIG. 9 is an enlarged cross-sectional view illustrating the electroplated material of FIG. 8 with the master removed.

Once material 80 is electroformed on the master surface sufficient to completely cover mastered features 72 and pyramid-like protrusions 74, the master can be removed from the electroformed structure (63). For example, FIG. 9 shows the electroformed structure 90 after the master has been removed. The master may be removed by physically separating the master 70 from electroformed material 80 (FIG. 8). Any excess mastered material that remains in the cavities 92 or channels 93 may be removed by a stripper chemical, or the like.

Next, a portion of the electroformed material can be removed (64) to expose channels 53 (FIG. 5) defined by the pyramid-like protrusions 74 (FIG. 8). For example as shown in FIG. 9, the portion 95 of the electroplated structure 90 can be removed, such as by etching or abating the material away. In this manner, the microreplication tool illustrated in FIG. 5 can be created. In that case, channels 53 can be exposed by removing material 95 (FIG. 9) such that gas can escape from cavities 52 through channels 53 (FIG. 5). For example, material 95 may be removed to an extent sufficient to expose channels 93 by a dimension less than approximately 20 microns, 10 microns, 1 micron, or even 0.1 micron. In other words, an aperture defined by exposed channels following the removal of material 95 may have an aperture width less than approximately 20 microns, 10 microns, 1 micron, or even 0.1 micron.

After removing the excess electroformed material to expose the channels in the tool (64), the tool can be used in a microreplication process (65). In that case, during the microreplication process, microreplication material may completely fill cavities 52 because gasses, such as air, can escape through channels 53 (FIG. 5).

In some cases, a number of segmented electroformed structures can be positioned over a larger surface to define a larger microreplication tool. In other words, the process illustrated in FIG. 6 may be repeated to create a number of segments of a molding tool that can be positioned or assembled according to the shape of the molding tool.

To even further improve filling of cavities of the microreplication tool, the surface of the tool may be textured or roughened. For example, surface 48 of microreplication tool 40, or surface 58 of microreplication tool 50 may be textured, such as by sandblasting the surface after creating the tool. Texturing the side-walls and/or the bottoms of the cavities may be particularly useful to improve filling of the cavities.

Figure 10:
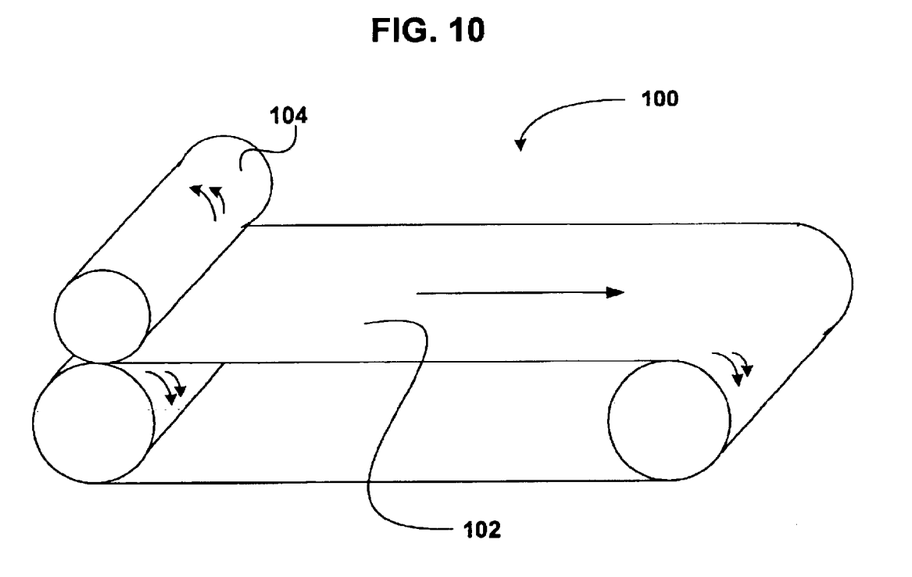
FIG. 10 is a perspective view of a microreplication system making use of a microreplication tool in the form of a casting belt according to an embodiment of the invention.

FIG. 10 is a perspective view of a microreplication system 100 making use of a microreplication tool in the form of a casting belt 102 according to an embodiment. In that case, material can be extruded by passing the material between casting belt 102 and a roller 104. For example, the casting belt 102 may comprise a number of segmented electroformed structures that include cavities with channels disposed at the bottoms of the respective cavities to allow gas to escape from the cavities during the microreplication process. In other words, casting belt 102 may be assembled from a number of segmented electroformed structures created as described above.

Figure 11:
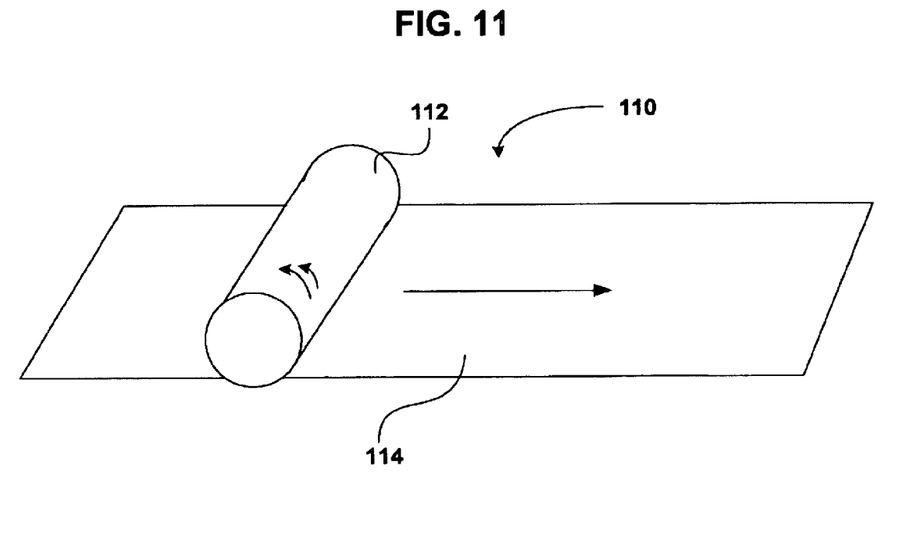
FIG. 11 is a perspective view of a microreplication system making use of a microreplication tool in the form of a casting roller according to an embodiment of the invention.
Figure 12:
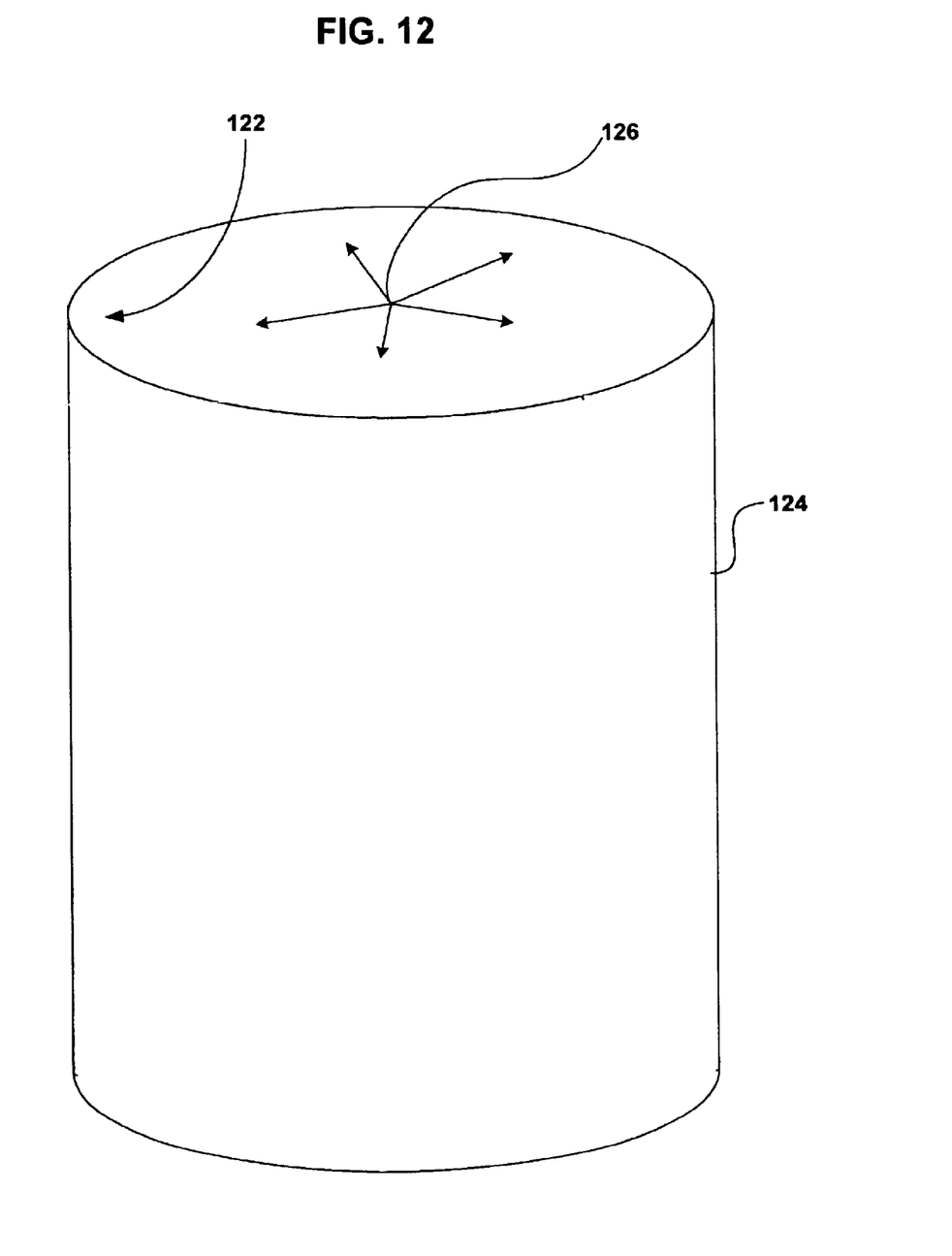
FIG. 12 is a perspective view of an electroplating apparatus for creating a casting roller according to an embodiment of the invention.

FIG. 11 is another perspective view of a microreplication system 110 making use of a microreplication tool in the form of a casting roller 112. In that case, material can be extruded by passing the material between casting roller 112 and a conveyor 114. Additional nip rollers may also be provided on the back side of conveyor 114. FIG. 12 is a perspective view of an electroplating apparatus for creating a casting roller like that illustrated in FIG. 11. For example, the master may be positioned on an inner surface 122 of cylindrical electroforming chamber 124. The electroforming process may cause the electroforming material to form on the master surface provided on inner surface 122 of cylindrical electroforming chamber 124 (as illustrated by arrows 126). Such electroforming techniques can be used to create a casting roller like that illustrated in FIG. 11. Importantly, by mastering pyramid-like protrusions 74 on mastered features 72, electroforming the material 80 over the pyramid-like protrusions 74 and mastered features 72, removing the master 70, and then removing a portion of the electroformed material 80 to expose channels defined by the pyramid-like protrusions 74, the microreplication tool can be enhanced as outlined above.

Figure 13A:
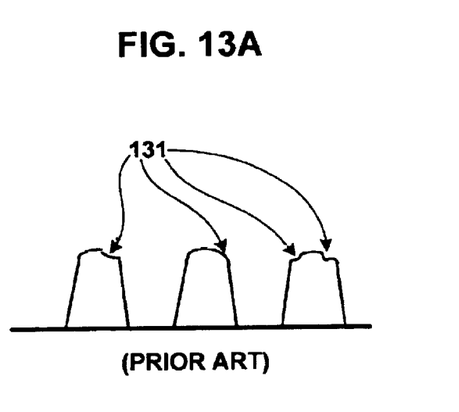
FIGS. 13A and 13B are cross-sectional diagrams comparing a conventional microreplicated structure to a microreplicated structure created using one or more techniques described herein.
Figure 13B:
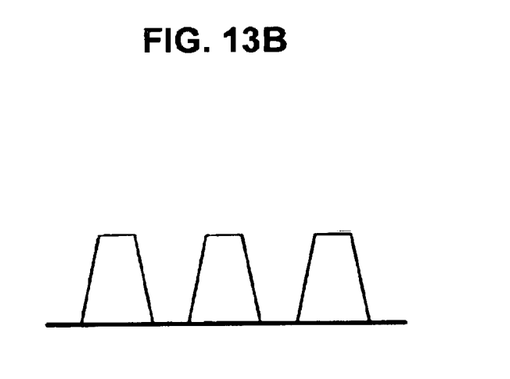

FIGS. 13A and 13B are cross-sectional diagrams comparing a conventional microreplicated structure with a microreplicated structure created using one or more techniques described herein. In particular, FIG. 13A illustrates a conventional microreplicated structure. FIG. 13A may be slightly exaggerated for illustrated purposes. Nevertheless, conventional microreplicated structures generally exhibit artifacts in the form of surface irregularities 131. In particular, surface irregularities 131 are caused by air entrapment in the microreplication tool. As illustrated, surface irregularities 131 may be generally exhibited on the top surfaces of the microreplicated features. In accordance with the embodiments outlined herein, surface irregularities 131 can be reduced or substantially eliminated as conceptually shown in FIG. 13B by utilizing microreplication tools that include gas release features disposed at the bottoms of the respective cavities to allow gas to escape from the cavities during the microreplication process. In this manner, improved microreplicated structures, like that illustrated in FIG. 13B can be realized.

A number of embodiments have been described. For example, a microreplication tool that includes gas release features that allows air or other gasses to escape from microreplication cavities of the tool has been described. Nevertheless, various modifications can be made to the embodiments described above without departing from the scope of the following claims. For example, the microreplication tool may be a tool other than a casting belt, a casting roller, or an injection molding tool. Also, although many detailed aspects have been described with specific reference to the creation of microreplicated mated surface fasteners, the invention is not necessarily limited in that respect. In other words, the techniques and microreplication tools described herein may be created according to any desired microreplication features. In addition, one or more of the structural devices and techniques may be extended for application in larger scale replication tools, such as tools used for replicating structures with larger features than those described herein. Accordingly, other implementations and embodiments are within the scope of the following claims.

What is claimed is:

1. A microreplication tool comprising:
    a microreplication surface formed with cavities that define microreplicated features during a microreplication process, wherein the cavities define substantially flat bottom regions which correspond to tops of the microreplicated feature; and
    air channels disposed adjacent the flat bottom regions of the respective cavities, the air channels sized to allow gas to escape from the cavities during the microreplication process, wherein the air channels define widths smaller than the flat bottom regions and wherein the widths of the flat bottom regions are between approximately 15 and 70 microns.

2. The microreplication tool of claim 1, wherein the air channels are sized so that substantially none of a material being microreplicated into the cavities can escape through the air channels.

3. The microreplication tool of claim 2, wherein the air channels have a cross-sectional dimension taken perpendicular to an air flow of air escaping the respective cavities that is less than approximately 20 microns.

4. The microreplication tool of claim 3, wherein the cross-sectional dimension is less than approximately 10 microns.

5. The microreplication tool of claim 4, wherein the cross-sectional dimension is less than approximately 1 micron.

6. The microreplication tool of claim 1, wherein the tool is an injection molding tool.

7. The microreplication tool of claim 1, wherein the tool is a casting belt for use in an extrusion process.

8. The microreplication tool of claim 1, wherein the tool is a casting roller for use in an extrusion process.

9. The microreplication tool of claim 1, wherein the tool is created by a process that includes:
    creating a master to define mastered features that are the inverse of the set of cavities, wherein the mastered features include pyramid-like protrusions at the ends of the mastered features;
    electroforming material on the master to create the microreplication tool;
    removing the master from the electroformed material; and
    removing a portion of the electroformed material to expose channels defined by the pyramid-like protrusions.

10. The microreplication tool of claim 1, wherein each of the cavities defines a depth greater than 1000 microns.

11. The microreplication tool of claim 1, wherein each of the cavities defines a depth that is at least approximately 5 times the widths of the flat bottom regions.

12. A microreplication tool comprising:
    a microreplication surface formed with means for defining microreplicated features during a microreplication process, wherein the means for defining the microreplicated features include a plurality of cavities and wherein the cavities define substantially flat bottom regions which correspond to tops of the microreplicated features; and
    means for allowing gas to escape from each of the plurality of cavities, wherein the means for allowing gas to escape includes air channels disposed adjacent the flat bottom regions of each of the plurality of cavities, the air channel sized to allow gas to escape from each of the plurality of cavities during the microreplication process, and wherein the air channels define widths smaller than the flat bottom regions and wherein the widths of the flat bottom regions are between approximately 15 and 70 microns.

* * * * *